Patented Feb. 16, 1932

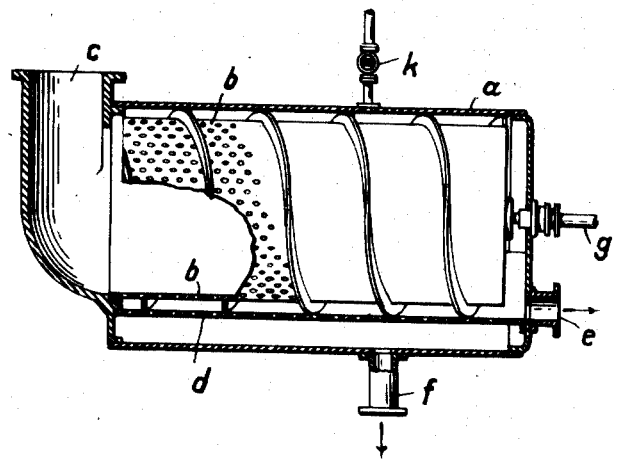
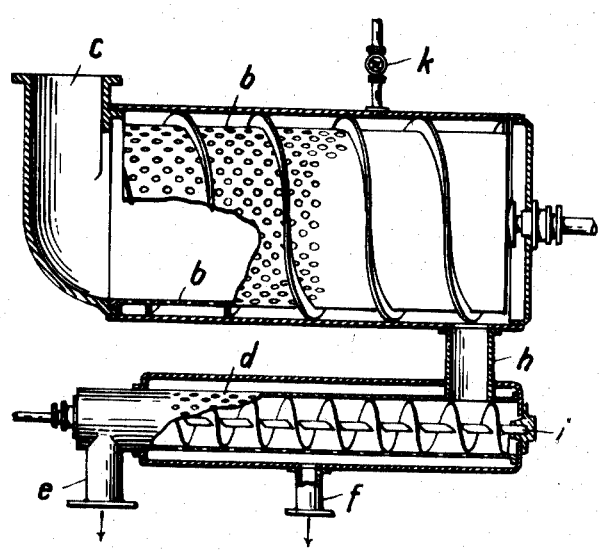

1,845,893

UNITED STATES PATENT OFFICE

AUGUST SOMMERMEYER, OF BERLIN-RUDOW, GERMANY, ASSIGNOR TO THE COMPANY RUD A. HARTMANN, OF BERLIN, GERMANY, A CORPORATION OF GERMANY

METHOD AND APPARATUS FOR TREATMENT OF ANIMAL MATTERS

Application filed April 26, 1929, Serial No. 358,400, and in Germany April 28, 1928.

This invention relates to a method and apparatus for treatment of animal matters, such as carcasses, slaughter house refuse and the like. Hence only such materials as will be disintegrated into paste by the steam and pressure are introduced into the sieve drum.

An important object of the invention is to ensure the recovery of certain by-products when working continuous processes with pressure and to avoid loss or deterioration of such by-products.

In the treatment of animal corpses, slaughter house waste, fish, fish waste etc., it is old to use a digestor of a horizontal type with a sieve drum adapted to receive the raw material and to rotate constantly while at the same time introducing steam in order to thoroughly cook the charge.

By the simultaneous action of steam at about 3 atm. and the constant turning of the sieve drum containing the material there is formed a mixture or paste of all parts of the raw material, flesh paste, solid constituents and fat. The paste enters through the holes in the sieve drum and passes into the outside space between the sieve drum and the digestor wall.

Formerly the paste was let out of the outside space into a receptacle or receiving tank. Here a decantation took place. At the bottom settled the solid constituents, above them the flesh paste, and above that the fat. The entire paste was therefore hitherto constantly let out of the digestor unseparated. In the case of this known process the solid constituents remained for a longer time in company with the liquid constituents and accordingly were exposed to the full operating pressure and to correspondingly high temperature. Because of this fact, the animal parts consisting of glue yielding substances are to a large extent disintegrated by hydrolysis whereby there is a considerable loss in value.

The present invention proposes therefore a new method of working which consists therein that the paste which leaves the sieve drum is separated directly thereafter by suitable mechanical means into its liquid constituents (fat and flesh paste) and its solid constituents. Immediately after the separation both the liquid as well as the solid constituents, in any case the latter, pass into a chamber which is subjected to slight pressure, as a rule under atmospheric pressure. A subsequent reduction in the quality of the products is in this manner prevented.

In the accompanying drawings are illustrated two constructional examples of apparatus for carrying out the new process.

In said drawings:

Figure 1 shows a vertical section through a digestor in which the separation is effected within the digestor;

Figure 2 shows a vertical section of a form of construction in which the digestor is connected with a special separating tank.

According to Figure 1 the digestor "$a$" is fitted with a sieve drum $b$. On a front side is placed a filling pipe $c$. Above this section (knee-shaped) is placed a filling tank (not shown) which receives the raw material and delivers it through the pipe (knee) to the sieve drum $b$.

The sieve drum $b$ is at its lower portion surrounded by a stationary sieve $d$. The sieve $d$ has fine holes of about 0.5 mm. width while the drum $b$ is provided with large holes of about 10 to 20 mm. diameter. Above the sieve there joins on to the right hand front wall of the digestor an evacuating pipe $e$ for the solid constituents.

The inlet pipe $c$ and the outlet pipes $e$ and $f$ are provided with the conventional valves (not shown) adapted to permit continuous or intermittent introduction into and removal of materials from the digestor without interference with the pressure existing therein. Applicant's prior United States Patent 1,046,402 discloses a suitable valve.

The filling pipe $c$ may connect with a filling tank which at its lowest point can be automatically shut off. The raw material is constantly brought into the filling tank and passes continuously and automatically into the sieve drum $b$.

For the purpose of thorough cooking, steam is introduced through the tube $k$, for example at pressure of three atmospheres. At the same time the sieve drum $b$ is rotated by means of the driving shaft $g$.

In consequence of the action of the steam and of the constant rotation of the sieve drum the raw material breaks down into a paste consisting of all the constituents. This paste enters through the large holes of the sieve drum $b$ into the space which lies between the drum and the stationary sieve $d$. On the periphery of the sieve drum $b$ is situated a worm conveyor which contacts on the sieve $d$. The worm pushes the paste consisting of all the constituents across the sieve $d$ to the evacuating pipe $e$. On its way the liquid constituents (fat and flesh broth) drip through the fine openings of the said stationary sieve and flow out of the pipe $f$.

When the solid constituents have been pressed out of the pipe $e$ they can at once be released from the high pressure to which they were subjected in the digestor. For example, by means of a dam or the like they can be forced into a chamber which is under atmospheric pressure. Also the liquid constituents by means of the pipe $f$ can be brought into a chamber under atmospheric or diminished pressure. Here there is also no objection to subjecting same to excess pressure.

Figure 2 has an extractor $a$ corresponding to the sieve drum $b$, filling pipe $c$, driving shaft $g$ and steam supply pipe $k$ to the digestor of Figure 1. Here, however, there is no stationary sieve in the digestor itself but the wall of the digestor concentrically encloses the sieve drum $b$.

The paste consisting of all elements is, in this embodiment, by means of the worm threads on the surface of the sieve drum $b$ pushed into a second pipe $h$ which discharges into a special tank. The latter is provided with a conveying worm $i$ of ordinary construction which is surrounded by a sieve jacket which fully embraces the worm $i$. The pipe $h$ opens into this sieve jacket and the latter is likewise provided with fine holes while the sieve drum $b$ has large holes.

The mixture coming through the pipe $h$ of all constituents is by means of worm $i$ conveyed through the sieve jacket surrounding the same. In this way the liquid constituents drip through the smaller openings of sieve $d$ and flow out of pipe $f$.

In the operation of prior methods of treating animal waste, glue yielding substances to a considerable degree have been unavoidably decomposed by hydrolysis while remaining in contact with the liquid constituents. In the instant process the glue yielding substances together with the solid materials are quickly separated from the liquid constituents with the result that the yield of glue is considerably increased.

Having thus described the invention, what is claimed as new and desired to be secured by Letters Patent is:

1. In the continuous process of treating animal bodies, slaughter house waste, fish waste, and the like wherein said material is converted by steam under pressure into a paste consisting of a mixture of fat, flesh water and solid residues, the steps comprising continuously sifting said paste from the unconverted material during said cooking operation and then continuously separating the sifted paste into its liquid and solid constituents while under the same pressure.

2. In the continuous process of treating animal bodies, slaughter house waste, fish waste, and the like wherein said material is converted by steam under pressure into a paste consisting of a mixture of fat, flesh water and solid residues, the steps comprising sifting said paste from the unconverted material during said cooking operation through a continuously rotating coarse meshed sieve drum and continuously mechanically separating the sifted paste into its liquid and solid constituents upon its discharge from said sieve drum.

3. In the process of treating animal bodies, slaughter house waste, fish waste and the like, in which said material is converted by stem under pressure into a paste consisting of its liquid and solid constituents, the steps comprising sifting said paste from the unconverted material during said cooking operation through a coarse meshed sieve drum and upon its discharge from said drum mechanically forcing it across a fine meshed drum whereby the liquid constituents are continuously separated from said solid constituents and finally separately withdrawing said solid and said liquid constituents.

4. In a digestor for treating animal bodies, slaughter house waste, fish waste and the like having a rotatable coarse meshed drum adapted to hold said material for a continuous cooking process under steam and pressure, the improvements comprising providing a fine meshed screen and a conveyor worm in such position as to receive cooked material from said coarse meshed drum and to mechanically separate it into solid and liquid constituents.

5. In a digester for treating animal bodies and the like in a continuous manner wherein the material is heated under pressure, the combination comprising a rotatable coarse meshed drum with a means for mechanically separating the cooked material after passage through said drum, into its solid and liquid constituents.

6. In a digestor of the class described, in combination, a rotatable coarse sieve drum, a worm conveyor on the outer surface of said drum, a stationary finer sieve surrounding the lower portion of said coarse sieve drum, an outlet for solid material above said fine sieve and an outlet for liquid material below said fine sieve.

7. In a digestor of the class described adapted for the continuous treatment of material under heat and pressure, in combination, a casing, a rotatable coarse sieve drum in said casing, a worm conveyor on the outer surface of said drum, a tank, a fine sieve drum in said tank communicatively connected with said digestor, a worm conveyor in said fine sieve drum, an outlet for solid material connected to said fine sieve drum, and an outlet for solid material connected to said fine sieve drum and an outlet for liquid material connected to said tank.

AUGUST SOMMERMEYER.